(12) United States Patent
Mitchell et al.

(10) Patent No.: US 8,904,339 B2
(45) Date of Patent: Dec. 2, 2014

(54) METHOD AND SYSTEM FOR MODELING RUNTIME BEHAVIOR

(75) Inventors: Nicholas Matthew Mitchell, White Plains, NY (US); Gary S. Sevitsky, New York, NY (US); Harini Srinivasan, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 2415 days.

(21) Appl. No.: 11/546,395

(22) Filed: Oct. 12, 2006

(65) Prior Publication Data

US 2008/0127046 A1    May 29, 2008

(51) Int. Cl.
G06F 9/44        (2006.01)
G06F 11/36       (2006.01)

(52) U.S. Cl.
CPC ................................ *G06F 11/3612* (2013.01)
USPC ......................................... 717/104; 717/128

(58) Field of Classification Search
USPC .................................................. 717/104, 128
See application file for complete search history.

(56) References Cited

U.S. PATENT DOCUMENTS

| | | | | |
|---|---|---|---|---|
| 5,729,746 A * | 3/1998 | Leonard | ........................ | 717/101 |
| 6,397,192 B1 * | 5/2002 | Notani et al. | ................ | 705/7.26 |
| 6,904,590 B2 * | 6/2005 | Ball et al. | ...................... | 717/132 |
| 7,047,521 B2 * | 5/2006 | Bunnell | ........................ | 717/130 |
| 7,185,317 B2 * | 2/2007 | Fish et al. | ..................... | 717/121 |
| 2005/0091642 A1 * | 4/2005 | Miller | ........................... | 717/124 |
| 2007/0006177 A1 * | 1/2007 | Aiber et al. | .................. | 717/136 |
| 2007/0169052 A1 * | 7/2007 | Vanrenen et al. | ............. | 717/154 |

* cited by examiner

*Primary Examiner* — Li B Zhen
*Assistant Examiner* — Hang Pan
(74) *Attorney, Agent, or Firm* — Vazken Alexanian; McGinn IP Law Group, PLLC

(57) ABSTRACT

A method (and system) of modeling runtime behavior for a software application includes limiting a portion of a run to be analyzed using criteria that define an analysis scenario, structuring events of the analysis scenario as a flow of logical content through a plurality of transformations, applying labels to elements of the flow, and generating a behavior signature for the analysis scenario based on the labels.

18 Claims, 12 Drawing Sheets

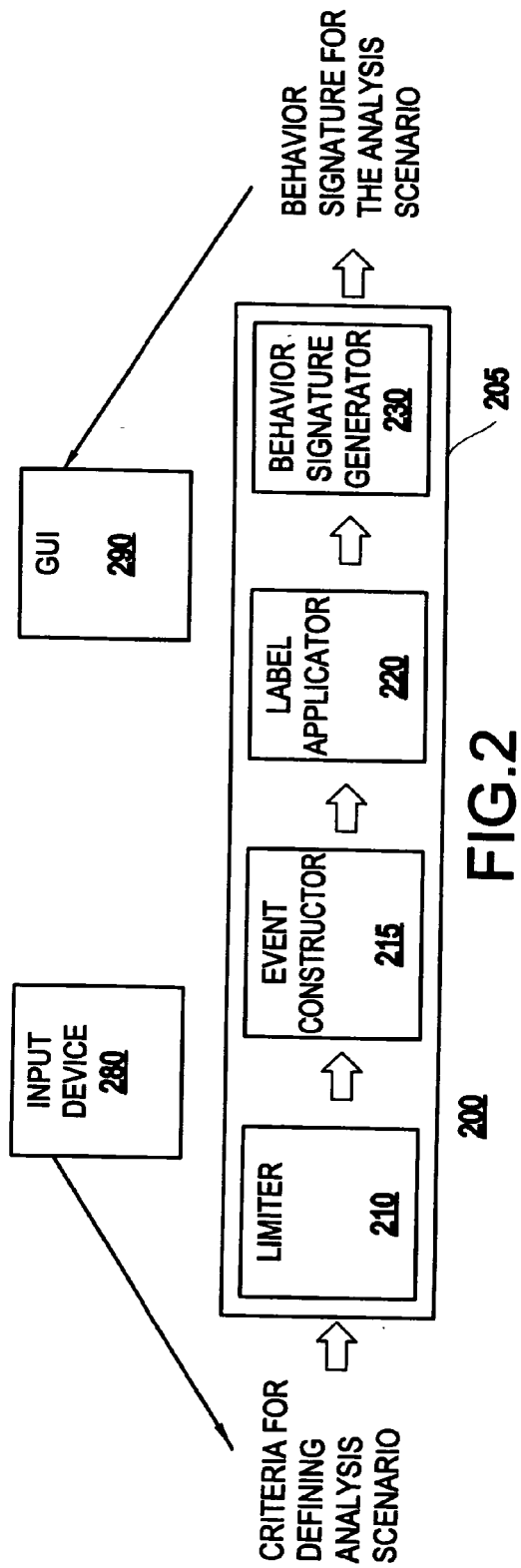
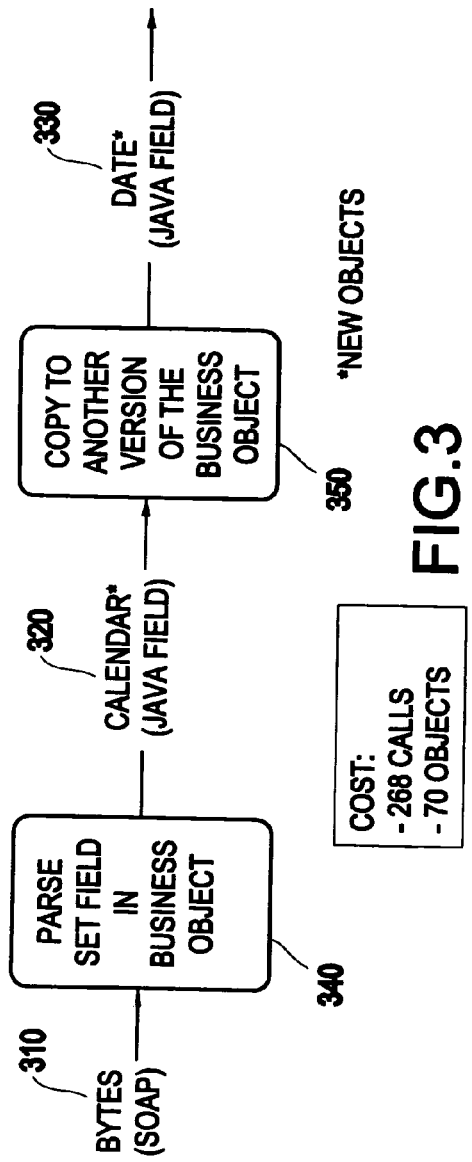
FIG.2
FIG.3

TABLE 1

| PHENOMENA | | | EXAMPLE |
|---|---|---|---|
| CARRIER | | | THE JAVA FORM OF AN EMPLOYEE OBJECT |
| FACILITATOR | METADATA | SCHEMA | JAVA CLASS INFO; RECORD LAYOUT |
| | | FORMAT | USER PREFERENCES FOR WEB PAGE LAYOUT |
| | CONVERTER | | BYTE TO CHAR CONVERTER, SOAP DESERIALIZER |
| | PROTOCOL ENABLER | CONNECTION | DATABASE CONNECTION OR FILE DESCRIPTOR |
| | | CURSOR | ITERATOR OR BUFFER POSITION |
| | | STATUS | CONDITION OR ERROR CODES |

FIG.7

TABLE 2

| PHENOMENA | EXAMPLE | WHAT CHANGED? | |
|---|---|---|---|
| STRUCTURE COPY | STRING TO StringBuffer | COPY<br>BIT CHANGE<br>TYPE CHANGE<br>ID CHANGE<br>NEW OBJECT | ✓<br>✗<br>•<br>✓<br>• |
| REWRAP | StringBuffer TO STRING THAT REUSES THE UNDERLYING CHARACTER ARRAY | COPY<br>BIT CHANGE<br>TYPE CHANGE<br>ID CHANGE<br>NEW OBJECT | ✗<br>✗<br>•<br>✓<br>✓ |
| CONVERSION | BYTES TO CHARACTERS | COPY<br>BIT CHANGE<br>TYPE CHANGE<br>ID CHANGE<br>NEW OBJECT | ✓<br>✓<br>•<br>•<br>• |
| BOX OR UNBOX | PRIMITIVE INT TO INTEGER OBJECT | COPY<br>BIT CHANGE<br>TYPE CHANGE<br>ID CHANGE<br>NEW OBJECT | ✗<br>✗<br>•<br>✓<br>• |

FIG.9

TABLE 3

| PHENOMENA | EXAMPLE | WHAT CHANGED? | |
|---|---|---|---|
| INFORMATION PRESERVING | CONVERT STOCK HOLDING FROM A DATABASE RECORD TO A JAVA OBJECT | INSTANCE<br>VALUE<br>GRANULARITY | ×<br>×<br>× |
| INFORMATION EXCHANGE | GET SCHEMA INFORMATION GIVEN A TYPE NAME | INSTANCE<br>VALUE<br>GRANULARITY | ✓<br>✓<br>• |
| VALUE ADDED | ADD TAX TO A PURCHASE TOTAL | INSTANCE<br>VALUE<br>GRANULARITY | ×<br>✓<br>× |
| EXTRACT OR COMBINE | GET OR SET THE PURCHASE DATE FIELD OF A JAVA STOCK HOLDING OBJECT | INSTANCE<br>VALUE<br>GRANULARITY | ×<br>×<br>✓ |
| JOIN OR PROJECT | JOIN STOCK HOLDING AND STOCK QUOTE OBJECTS INTO A NEW OBJECT CONTAINING SOME FIELDS OF EACH | INSTANCE<br>VALUE<br>GRANULARITY | ✓<br>×<br>× |

FIG.10

TABLE 4

| CHANGE IN PHYSICAL REPRESENTATION | # TRANSFORMATIONS |
|---|---|
| COPIES | 5 |
| BIT CHANGES | 1 |
| TYPE CHANGES | 6 |

FIG.11

TABLE 5

| CHANGE IN LOGICAL CONTENT | # TRANSFORMATIONS | # OBJECTS CREATED |
|---|---|---|
| INFORMATION PRESERVING | 6 | 59 |
| INFORMATION EXCHANGE | 2 | 5 |
| EXTRACT/COMBINE | 2 | 6 |

FIG.12

TABLE 6

| KIND OF FLOW | # METHOD CALLS | # TEMPS |
|---|---|---|
| FLOWS THAT PRODUCE SCHEMA | 10 | 0 |
| FLOWS THAT PRODUCE CONVERTERS | 76 | 18 |
| CARRIER FLOWS | 192 | 52 |

FIG.13

TABLE 7

| IMPLEMENTATION (FRAGMENTS FROM VARIOUS CLASSES) | BIT CHANGE | COPY | EXCHANGE | CARRIER |
|---|---|---|---|---|
| PRE 1.4.2 | append(String.valueOf(x)) | 1 | 2 | 0 | 1 |
| 1.4.2 | char [ ] A = threadLocal.get(); Integer.getChars(x,A); append(A); | 1 | 2 | 1 | 0 |
| 1.5.0 | ensureCapacity(stringSizeOfInt(x)); char [ ] A = this.value; Integer.getChars(x,A); | 1 | 1 | 0 | 0 |

FIG.14

TABLE 8

| PHENOMENA | DATE FIELD | | BIGDECIMAL FIELD | |
| | APP1 | APP2 | BENCHMARK | APP2 | BENCHMARK |
|---|---|---|---|---|---|
| BOX/UNBOX | 3 | 0 | 0 | 4 | 0 |
| STRUCTURE COPY | 0 | 2 | 0 | 1 | 0 |
| REWRAP | 0 | 2 | 1 | 1 | 1 |
| CONVERT | 1 | 4 | 1 | 5 | 1 |

FIG.15

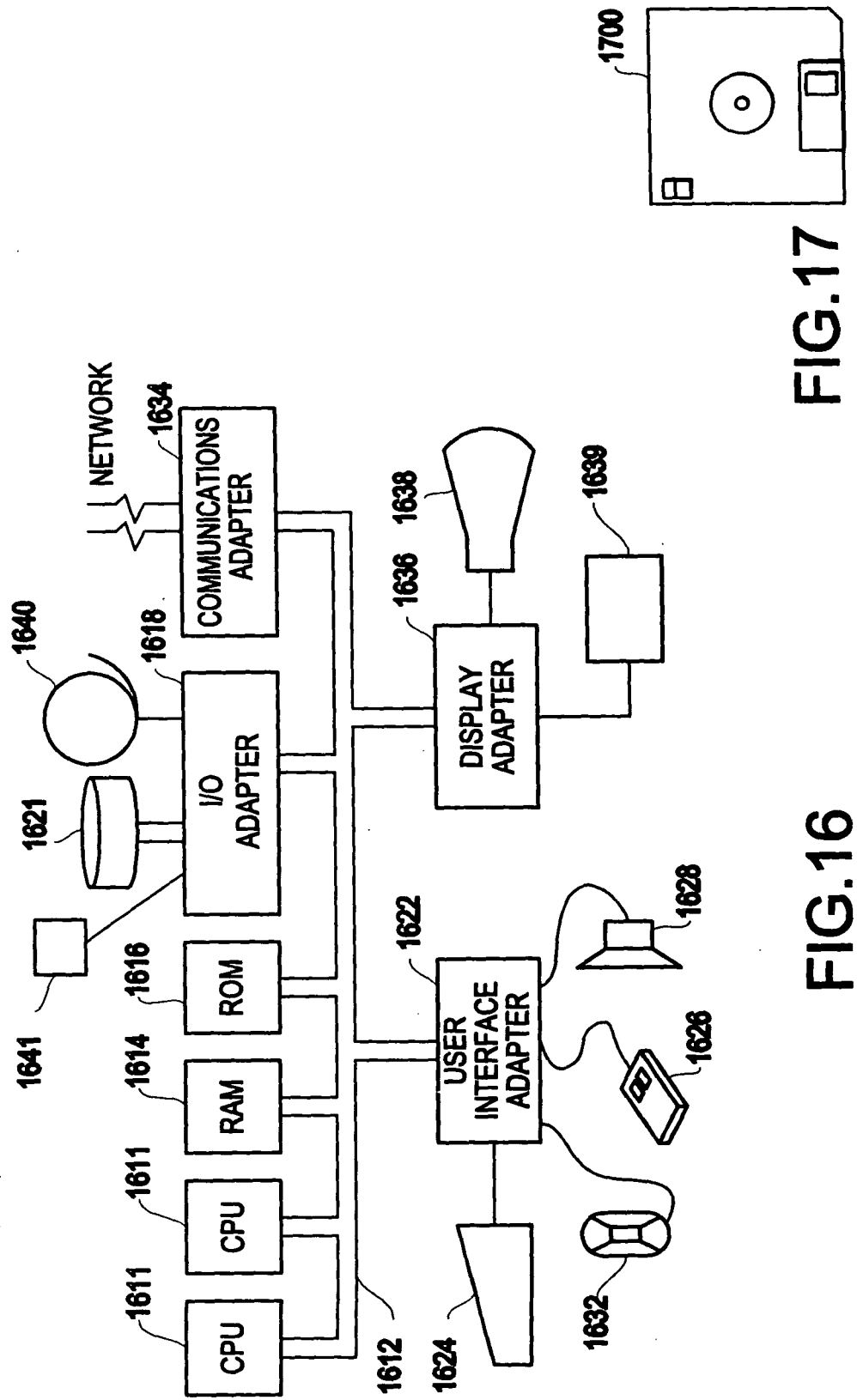

METHOD AND SYSTEM FOR MODELING RUNTIME BEHAVIOR

BACKGROUND OF THE INVENTION

1. Field of the Invention

The present invention relates to a method (and system) of modeling runtime behavior for a software application, and more particularly, to a method of modeling runtime behavior for a software application which includes generating a behavior signature for an analysis scenario based on labels applied to a flow of logical content through a plurality of transformations.

2. Description of the Related Art

Large-scale applications are being built by integrating numerous libraries and frameworks (e.g., reusable frameworks), such as web application servers (e.g., servers that use Simple Object Access Protocol (SOAP), Enterprise Java-Beans™ (EJB), JavaServer Pages (JSP), etc.), portal servers, client platforms (e.g., Eclipse), and industry-specific frameworks.

While this approach has many advantages, it can make it difficult to achieve good performance, and difficult to understand and assess how and why performance is poor. Problems in these systems tend to be diffuse, rather than concentrated in a few performance hot spots. The inefficiencies in these systems reflect the combined architecture and implementation choices of numerous independent framework developers. These systems, even when tuned, seem to use an excessive amount of resources to accomplish simple functions. In general the runtime behavior of these systems can be difficult to understand.

Current approaches to solving these problems include performance tools that help identify hot spots in a single system, characterization approaches that measure low-level resource characteristics for a class of programs, and program understanding tools that analyze a single system by following the flow of physical data through program variables.

However, a number of problems are not addressed by the current approaches. Namely, these approaches do not assess whether a program or framework is using excessive resources for what the program/framework accomplishes; assess which kinds of design and framework implementation practices are performant; characterize classes of systems in a way that would enable the design and validation of appropriate benchmarks; characterize classes of systems in a way that would enable the identification of broader optimization opportunities; communicate and measure runtime phenomena in programs in a way that is familiar to people unfamiliar with particular code, and enables comparisons across disparate systems and against benchmarks; understand the behavior of systems where the primary activity is transforming and transporting information between various standards, and facilitating those transformations.

SUMMARY OF THE INVENTION

In view of the foregoing and other exemplary problems, drawbacks, and disadvantages of the conventional methods and structures, a purpose of the exemplary aspects of the present invention is to provide a method and system which provides an approach to understanding the general causes of runtime complexity and inefficiency in large-scale applications.

One aspect of the present invention is directed to a method of modeling runtime behavior for a software application. The method includes limiting a portion of a run to be analyzed using criteria that define an analysis scenario, structuring events of the analysis scenario as a flow of logical content through a plurality of transformations, applying labels to elements of the flow, and generating a behavior signature for the analysis scenario based on the labels.

Another aspect is directed to a system for modeling runtime behavior for a software application. The system includes a limiter which limits a portion of a run to be analyzed using criteria that define an analysis scenario, an event structurer which structures events of the analysis scenario as a flow of logical content through a plurality of transformations, a label applicator which applies labels to elements of the flow, and a behavior signature generator which generates a behavior signature for the analysis scenario based on the labels.

Another aspect of the present invention includes a programmable storage medium tangibly embodying a program of machine-readable instructions executable by a digital processing apparatus to perform the method according to the exemplary aspects of the present invention.

In still another aspect, the method according to the exemplary aspects of the present invention may include deploying computing infrastructure in which computer-readable code is integrated into a computing system, such that the code and the computing system combine to perform the method.

With its unique and novel features, the present invention provides a method and system for modeling runtime behavior, and more particularly, a method and system which provides an approach to understanding the general causes of runtime complexity and inefficiency in large-scale applications.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 2 illustrates a system 200 for modeling runtime behavior, according to an exemplary aspect of the present invention;

FIG. 3 illustrates a dataflow diagram of how the Trade benchmark may transform a date, from a SOAP message to a Java object, according to an exemplary aspect of the present invention;

FIG. 7 provides Table 1 which illustrates common phenomena that the inventors have identified, arranged as a taxonomy, according to an exemplary aspect of the present invention;

FIG. 9 provides Table 2 which illustrates four phenomena (e.g., structure copy, rewrap, conversion, and box or unbox) that commonly occur in framework-based applications, according to an exemplary aspect of the present invention;

FIG. 10 provides Table 3 which lists we identify common phenomena of change in logical content, according to an exemplary aspect of the present invention;

FIG. 11 provides Table 4 which includes behavior signature of the analysis scenario of FIG. 6, with transformations broken down by change in physical content, according to an exemplary aspect of the present invention;

FIG. 12 provides Table 5 which includes two behavior signatures of FIG. 5, with transformations and object creations broken down by change in logical content, according to an exemplary aspect of the present invention;

FIG. 13 provides Table 6 which provides two flow-induced behavior signatures for FIG. 8 that break down cost by the purpose of data produced, according to an exemplary aspect of the present invention;

FIG. 14 provides Table 7 which illustrates how behavior signatures may help to compare three implementations of the standard Java library method StringBuffer.append(int x), according to an exemplary aspect of the present invention;

FIG. 15 provides Table 8 which illustrates how behavior signatures may help to validate a benchmark against two applications of the kind it is intended to mimic, according to an exemplary aspect of the present invention;

FIG. 16 illustrates a typical hardware configuration which may be used for implementing the system and method according to the exemplary aspects of the present invention; and FIG. 17 illustrates a programmable storage medium 1700 tangibly embodying a program of machine-readable instructions executable by a digital processing apparatus to perform the method according to the exemplary aspects of the present invention.

DETAILED DESCRIPTION OF EXEMPLARY EMBODIMENTS OF THE INVENTION

Figure 1:
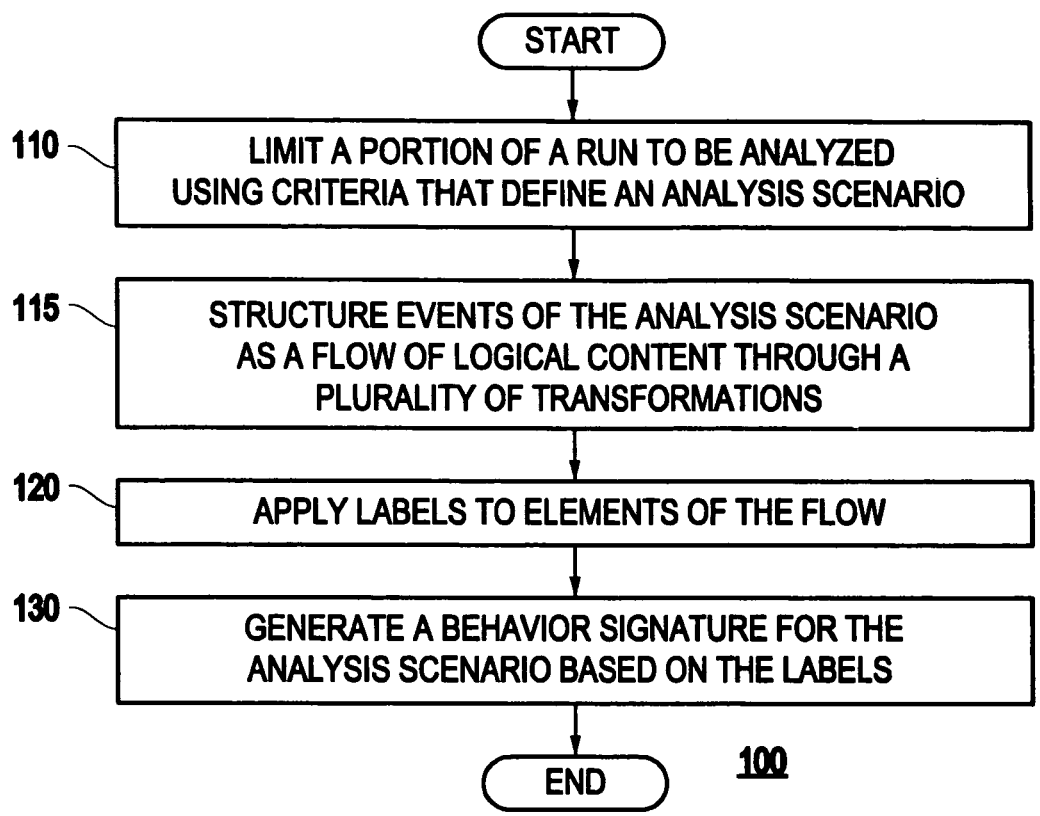
FIG. 1 illustrates a method 100 for modeling runtime behavior, according to an exemplary aspect of the present invention.

Referring now to the drawings, and more particularly to FIGS. 1-17, there are shown exemplary embodiments of the method and structures of the present invention.

As illustrated in FIG. 1, an exemplary aspect of the claimed invention includes a method 100 for modeling runtime behavior for an application (e.g., a software application). The method 100 includes limiting (110) a portion of a run to be analyzed using criteria that define an analysis scenario, structuring (115) events of the analysis scenario as a flow of logical content through a plurality of transformations, applying (120) labels to elements of the flow, and generating (130) a behavior signature for the analysis scenario based on the labels.

As illustrated in FIG. 2, the present invention also includes a system 200 for modeling runtime behavior for a software application, which may be used to perform the method 100. The system 200 includes a limiter 110 which limits a portion of a run to be analyzed using criteria that define an analysis scenario, an event structurer 115 which structures events of the analysis scenario as a flow of logical content through a plurality of transformations, a label applicator 220 which applies labels to elements of the flow, and a behavior signature generator 230 which generates a behavior signature for the analysis scenario based on the labels.

It should be noted that the system 200 may be a hardware-implemented system or a software-implemented system. If the system 200 is a software-implemented system, the system 200 may include a processor 205 (e.g., computer processor), and the limiter 210, event structurer 215, label applicator 220 and behavior signature generator 230 may be implemented as modules of a software application which are executed by the processor 205 to analyze a portion of a run (e.g., perform the method 100). Thus, the system 200 may include, for example, an input device 280 (e.g., keyboard, mouse, etc.) and a graphical user interface (GUI) 290 (e.g., display device for displaying tables, dataflow diagrams, etc.) which may be used to allow a user to input data regarding the run to be analyzed, and read the data (e.g., behavior signature) generated by the system 200. The system may also include a memory (e.g., Read Only Memory (ROM), Random Access Memory (RAM), etc.) for storing the software which is executed to perform the method according to the present invention.

For example, a user of the system 200 may use the input device 280 to input criteria for defining an analysis scenario, and may use the GUI 290 to view the data (e.g., behavior signature) output by the system 200.

Overview

The present invention may include a method of analyzing a portion of one or more runs (e.g., runs of a software application). In an exemplary aspect of the present invention, a user may provide criteria to limit what is analyzed, by defining an analysis scenario which focuses on the production of some information (e.g., logical content). The program activity for that scenario may then be mapped into a dataflow diagram (e.g., a hierarchy of data flow diagrams) which is organized to show the flow of logical content through various transformations. The diagrams may include additional transformations that facilitate those transformations.

The structuring as logical data flow may make visible the couplings among frameworks, and may aid in blame assignment for systemic problems. In addition, the present invention may provide new types of measures based on the structuring. Namely, the invention may enable cost and complexity measures that can be related to what is accomplished by a program, and may enable new metrics that capture runtime complexity.

Further, the present invention may introduce a system of vocabulary for labeling what transformations and their inputs/outputs accomplish. Vocabulary is in terms of common runtime phenomena found across programs that have disparate implementations. Vocabulary is not necessarily dependent on the names of artifacts from individual programs. A number of orthogonal dimensions of vocabulary have been identified.

In addition, the present invention may introduce a measure, known as a "behavior signature", that may aggregate cost or complexity metrics based on classification of activity according to the vocabulary. Further, the vocabulary and metrics may enable communication about unfamiliar programs in commonly understood terms; comparison across programs built using different frameworks or implementations; and a "descriptive characterization", where measurements can be associated with higher-level phenomena for whole classes of applications.

In developing the present invention, the inventors analyzed the performance of dozens of industrial framework-based applications. Their analysis revealed that an enormous amount of activity was executed to accomplish simple tasks. This was the case even after some tuning effort was applied. For example, a stock brokerage benchmark executed 268 method calls and created 70 new objects just to move a single date field from SOAP to Java.

The present invention may identify bottlenecks in such applications, and may present an approach to understanding the general causes of runtime complexity and inefficiency in these applications.

Based on their research, the inventors concluded that inefficiencies are not typically manifested in a few hot methods. Instead, the inefficiencies are mostly due to a constellation of transformations. Each transformation takes data produced in one framework and makes it suitable for another. Problems are less likely to be caused by poor algorithm choices, than by the combined design and implementation choices made in disparate frameworks.

In a web-based server application, for example, the data may arrive in one format, be transformed into a Java business object, and the business object may be sent to a browser or another system (e.g. from SOAP, to an EJB, and finally to extensible markup language (XML)). Surprisingly, inside each transformation are often many smaller transformations, and inside these smaller transformations are often yet more transformations, which are (e.g., each) the result of lower-level framework coupling.

In addition, many steps are often required to facilitate these transformations. For example, a chain of lookups may be needed to find the proper SOAP deserializer. In the inventors' benchmark example, moving that date from SOAP to Java took a total of 58 transformations.

However, with conventional methods it may be difficult to know if 58 transformations is excessive for this operation, and if so, what could possibly require so many transformations. Traditional performance tools model runtime behavior in terms of implementation artifacts, such as methods, packages, and call paths. Transformations, however, may be implemented as sequences of method calls which span multiple frameworks.

Detailed Discussion

The present invention presents an approach for understanding and quantifying behavior (e.g., runtime behavior of a software application) in terms of transformations and what transformations accomplish. We demonstrate how this model enables:

1) Evaluation of an implementation to understand the nature of the implementation's complexity and costs, and assess whether the costs are excessive for what was accomplished; and 2) Comparison of implementations that accomplish similar functionality, but use different frameworks or physical data models.

The behavior of a run may be modeled in the present invention by structuring the run as the flow of data through transformations, and by classifying the data and/or transformations in a way (e.g., multiple ways) to give insight into what the transformations accomplished. Both the structuring and classification may be in terms that are abstracted from the specifics of any framework.

This modeling approach may enable a powerful manner of evaluation and comparison, based on complexity and cost metrics introduce by the present invention. Generating a model and computing metrics may be a manual process or may be automated.

Structuring Behavior

FIG. 3 illustrates a dataflow diagram of how the Trade benchmark may transform a date, from a SOAP message to a Java object. There often are multiple physical representations of the same logical content. For example, the same date may be represented as bytes within a SOAP message, and later as a Java Date object.

The present invention may structure runtime activity as data flow of logical content, as illustrated in FIG. 3. The present invention may illustrate the data flow as a data flow diagram (e.g., a hierarchy of data flow diagrams). Each edge (e.g., a flow of data into a transformation or out of a transformation) may represent the flow of a physical representation of some logical content. A "node" may represents a transformation—a change in logical content or physical representation of its inputs.

Many types of processing can be viewed as transformations. For example, a transformation may be a physical change only, like converting information from bytes to characters or copying it from one location to another; it may be a lookup of associated information, such as finding a quote for a stock holding; or it may be implementing business logic, such as adding a commission to a stock sale record.

It may not be feasible to have a dataflow diagram show an entire run. Thus, the present invention introduces the concept of an analysis scenario that may filter the analysis to show the production of some specified information (e.g., focus on production of particular data). The present invention may also show how to group the activity and data of an analysis scenario into a hierarchy of dataflow diagrams.

Classifying Behavior

The present invention may classify transformations and/or the data flowing between the transformations to gain insight into why the transformations occur (e.g., are necessary). Over years of analyzing industrial applications, the present inventors have seen many commonalities in how transformations use their inputs, and in how transformations change their inputs. To capture this, the present invention introduces a number of orthogonal ways to classify (e.g., classify the transformations and/or the data flowing between the transformations) by these common phenomena of use and change. The present invention also introduces a vocabulary for these phenomena.

For example, a transformation that converts a stock holding from SOAP to a Java object takes as input both the SOAP message and a parser. A classification in the present invention may distinguish these two inputs as serving different purposes in the transformation: the message is a carrier of the data being processed, and the parser is a facilitator of the conversion.

The present invention may also classify the transformation by how the transformation changes the physical representation of the carrier input data: the transformation effects a conversion. Another classification is of the change in logical content. In this case, the transformation may be labeled as information preserving.

Phenomena such as these capture properties that are abstracted from the specifics of any one framework or application. Structuring and classifying in framework-independent terms enables evaluation and comparison across disparate implementations. To this end, the present invention also introduces framework-independent metrics of runtime complexity and cost.

Quantifying Complexity

The present invention may use the number of transformations as an indicator of the magnitude of complexity. This measure may be aggregated in several different ways (e.g., two ways). First, the invention introduces metrics that aggregate based solely on the topology of the diagrams. For example, 58 transformations to convert one field seems excessive; knowing that 36 of these occurred while converting subfields indicates that the problem lies deep inside the standard Java libraries.

Second, to surface the specific kinds of complexity in an implementation, the present invention introduces behavior signatures. A behavior signature may count transformations by phenomenon. For example, the processing of each subfield may require five copies and six type changes, indicating poor framework coupling at the subfield level.

Quantifying Cost

The present invention can also aggregate traditional resource costs, such as number of instructions executed, or objects created, by topology and phenomena. Aggregating in these new ways, as opposed to by method, package, or call path, may provide more powerful metrics of cost for framework-based applications. As illustrated in the examples below, there may be benefits to reporting costs by transformation or analysis scenario.

Also as illustrated below, there may be benefits to cost behavior signatures that break down costs by phenomena. In fact, in an example of a behavior signature described below, of the 70 objects created in the processing of a purchase date field, 59 were due to transformations that did not change the logical content of the field.

In short, the present invention may provide an approach to modeling and quantifying runtime behavior in framework-independent terms, including:
1) A way to structure runtime behavior as the data flow of logical content through transformations;
2) Three orthogonal dimensions to classify what transformations and data accomplish;
3) A vocabulary of common phenomena for each dimension;
4) A way to induce the purpose of transformations from the purpose of the data the transformations help produce; and
5) New ways to measure complexity, and to aggregate complexity and resource cost measures.

Structuring Behavior

The present invention may model runtime behavior using data flow. Using the raw data flow information would likely give too much, and too low a level of information to make sense of. The present invention provides an approach to filtering and grouping activity into a hierarchy of data flow diagrams.

As noted above, FIG. 3 illustrates shows a dataflow diagram from a configuration of is the Trade 6 benchmark that acts as a SOAP client (the standard data flow notation for sources and sinks may be omitted and represented herein as unterminated edges). FIG. 3 follows the flow of one small piece of information, a field representing the purchase date of a stock holding, from a web service response into a field of the Java object that will later be used for producing HTML.

Each "edge" in the data flow diagram in FIG. 3 represents the flow of the physical form of some logical content. In FIG. 3, the same purchase date is shown on three edges. At the first edge 310, the date is in the form of some subset of the bytes in a SOAP response, then at the second edge 320, the date is in the form of a Java Calendar (and its subsidiary objects), and at a third edge 330, the date is in the form of a Java Date.

The nodes 340, 350 in the dataflow diagram of FIG. 3 depict a transformation of the data (e.g., the data input to the node). The nodes 340, 350 may group together invocations of many methods or method fragments, drawn from multiple frameworks.

Structuring in this way may relate the cost of disparate activity to the data it produced. FIG. 3 illustrates that the cost of the first transformation was 268 method calls and 70 new objects, mostly temporaries. This is the cost of producing an intermediate (Java object) form of the purchase date. (Note that a publicly available application server and a Java virtual machine (JVM) may be used to perform the run and, once in a steady state, ArcFlow and Jinsight may be used to gather raw information about the run, after just-in-time compiler (JIT) optimizations.)

Filtering by Analysis Scenario

The extent of a diagram may be defined by an analysis scenario that may include the following elements:
1) The output—the logical content whose production is followed;
2) The physical target of that logical content;
3) The physical sources of input data; and
4) Optional filtering criteria that limit activity to a specified thread, or an interval of time.

For example, FIG. 3 reflects an analysis scenario that follows the production of a purchase date field. The physical target of the analysis scenario is the Java object that will be used for generating HTML. The physical source of the analysis scenario is the SOAP message. Filtering criteria limit the diagram in FIG. 3 to just one response to a servlet request, and to the worker thread that processes that request. Note how the filtering criteria may allow the present invention to construct a diagram that omits any advance work not specific to a servlet response, such as initializing the application server.

Grouping Into Hierarchical Diagrams

Within an analysis scenario, the activity and data may be be grouped into data flow diagrams in various ways. In particular, the activity may be grouped into transformations to form an initial hierarchy of data flow diagrams. An additional rule may then be applied that identifies groups of transformations that may split out into additional levels of diagram.

Applications often have logical notions of granularity that cut across multiple type systems. For example, a stock holding record, whether represented as substrings of a SOAP message or as a Java object, may still be thought of as a record.

The present invention may follow the activity and intermediate data leading to the production of the scenario's output. The top-level diagram may show this at a single level of granularity, that of the output. A transformation (e.g., each transformation) may group together all activity required to change either the logical content or physical representation of its input data.

Note that some of the inputs to a transformation may be "facilitators", such as schemas or converters. In the diagram for the transformation, the sequence of transformations needed to produce these facilitators may also be included.

While one diagram may show data flow at a single level of granularity, the diagram may also show those transformations that transition between that granularity and the next lower one. For example, the transformation that extracts a field from a record may be included in the diagram of the record.

Additional levels of diagram may be formed to distinguish the parties responsible for a given cost. An architectural unit may be defined to be a set of classes. Given a set of architectural units, a hierarchical dataflow diagram may split the behavior such that the activity at one level of diagram is that caused by an architectural unit (e.g., at most one architectural unit).

The choice of architectural units allows flexibility in assigning responsibility for the existence of transformations. Architectural units may not necessarily align with package structure.

FIG. 3 illustrates the field-level activity that the application may initiate. Other field-level activity that SOAP is responsible for may be grouped under the first node. To analyze the behavior that SOAP causes, the present invention may "zoom in" to explore a subdiagram.

The Diary of a Date

The structure of node 340 (e.g., the first step of the diagram) in FIG. 3 may be further explored. This example illustrates how to apply the structuring approach, and also shows the kinds of complexity that may be encountered in real-world framework-based applications. In this example, the inventors chose a benchmark that has been well-tuned at the application level to demonstrate the challenges of achieving good performance in framework-based applications.

An additional three levels of diagram were generated by the inventors in this example. Two levels are the result of splitting according to architectural units (SOAP and the standard Java library), and one level is split according to granularity.

Diagram Level 1

Figure 4:
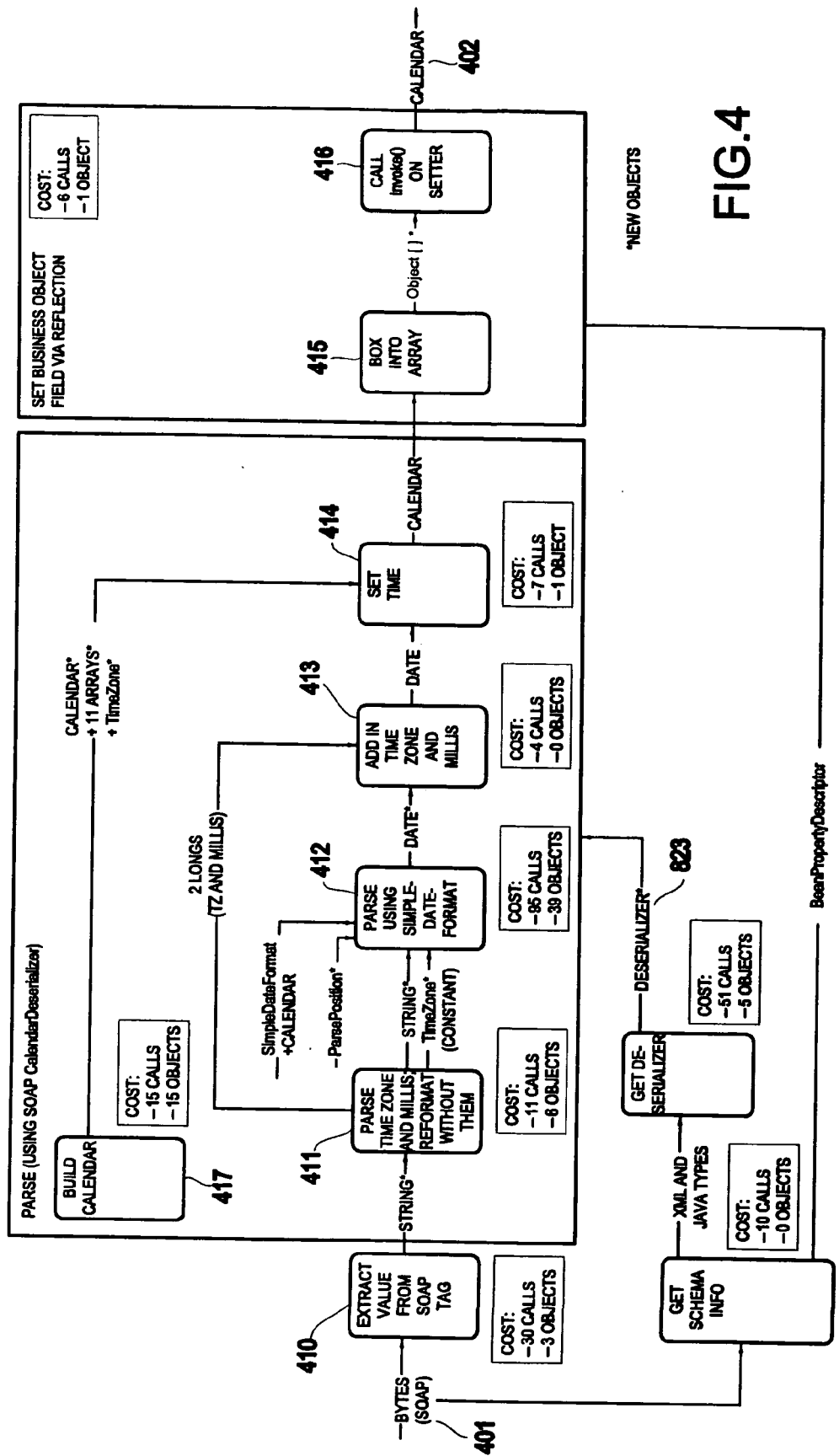
FIG. 4 illustrates how the present invention may "zoom in" on the first step of FIG. 3 to explore how the SOAP framework transforms the purchase date field, according to an exemplary aspect of the present invention.

FIG. 4 illustrates how the present invention may "zoom in" on the first step of FIG. 3 to explore how the SOAP framework transforms the purchase date field. Specifically, FIG. 4 shows the field-granularity activity that SOAP is responsible for within node 340 (e.g., the first transformation of FIG. 3).

In FIG. 4, the purchase date field flows along the middle row of nodes (e.g., nodes 410-416). Thus, at this level alone, the input bytes 401 undergo seven transformations (e.g., in nodes 410-416) before exiting as a Calendar field 402 in the Java business object.

The first transformation (e.g., node 410) extracts the bytes representing the purchase date from the XML text of a SOAP message, and converts it to a String. The String is passed to a deserializer (e.g., nodes 411-414) for parsing. The SOAP framework allows registration of deserializers for datatypes that can appear in messages. In the lower left corner is a sequence of transformations that look up the appropriate deserializer given the field name.

In FIG. 4, the five transformations related to parsing (e.g., nodes 411-414) are illustrated as a group to make it easier to see this functional relationship. The first step (node 411) takes the String, extracts and parses the time zone and milliseconds, and copies the remaining characters into a new String.

The reformatted date String is then passed to the SimpleDateFormat library class (node 412) for parsing. This is an expensive step, creating 39 objects (38 of them temporaries). A new Date object is returned and joined with the original time zone and milliseconds in node 413.

The Java library has two date classes. A Date object stores the number of milliseconds since a fixed point in time. A Calendar stores a date in two different forms, and can convert between them. One form is the same as in Date; the other includes seventeen integer fields that are useful for operating on dates, such as year, month, day, hour, or day of the week.

The top row of the dataflow in FIG. 4, includes an expensive transformation (e.g., node 417) that builds a new default Calendar from the current time. In node 414, the Date object is then used to set the value of this Calendar again. Finally, that Calendar becomes the purchase date field of our business object, via a reflective call to a setter method (e.g., nodes 415, 416). Java's reflection interface may first require that the Calendar be packaged into an object array.

Diagram Level 2

Figure 5:
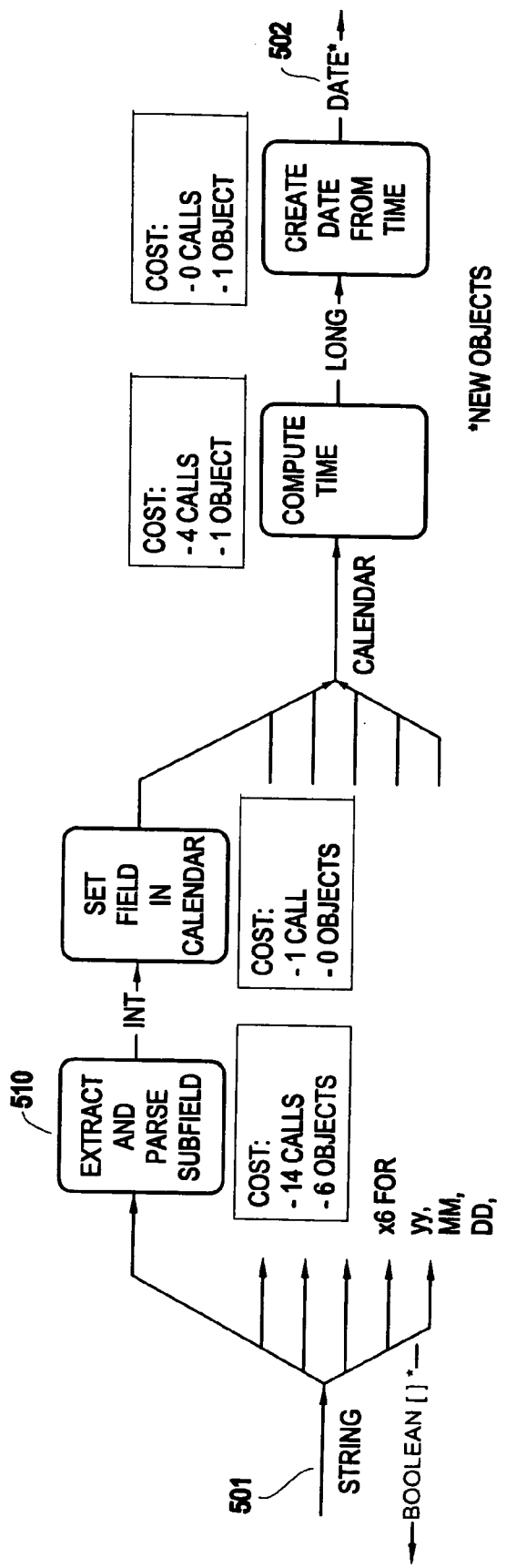
FIG. 5 further "zooms in" on the parse using node 412 (e.g., the SimpleDateFormat step) of FIG. 4, to illustrate how the standard Java library's date-handling code may transform the purchase date field, according to an exemplary aspect of the present invention.

FIG. 5 further "zooms in" on the parse using node 412 (e.g., the SimpleDateFormat step) of FIG. 4, to illustrate how the standard Java library's date-handling code may transform the purchase date field. That is, FIG. 5 zooms in to show the Java library's responsibility for the SimpleDateFormat parse transformation. In FIG. 5, the String 501 containing the date is input, and the String's six subfields (e.g., year, month, day, hour, minute, and second) may be extracted and parsed individually.

The SimpleDateFormat (node 412) may maintain its own Calendar, different from the one discussed earlier at the SOAP level. Once a subfield of date has been extracted and parsed into an integer, the corresponding field of the Calendar may be set. After all six subfields are set, the Calendar may convert this field representation into a time representation which may be used to create a new Date object 502.

Diagram Level 3

Figure 6:
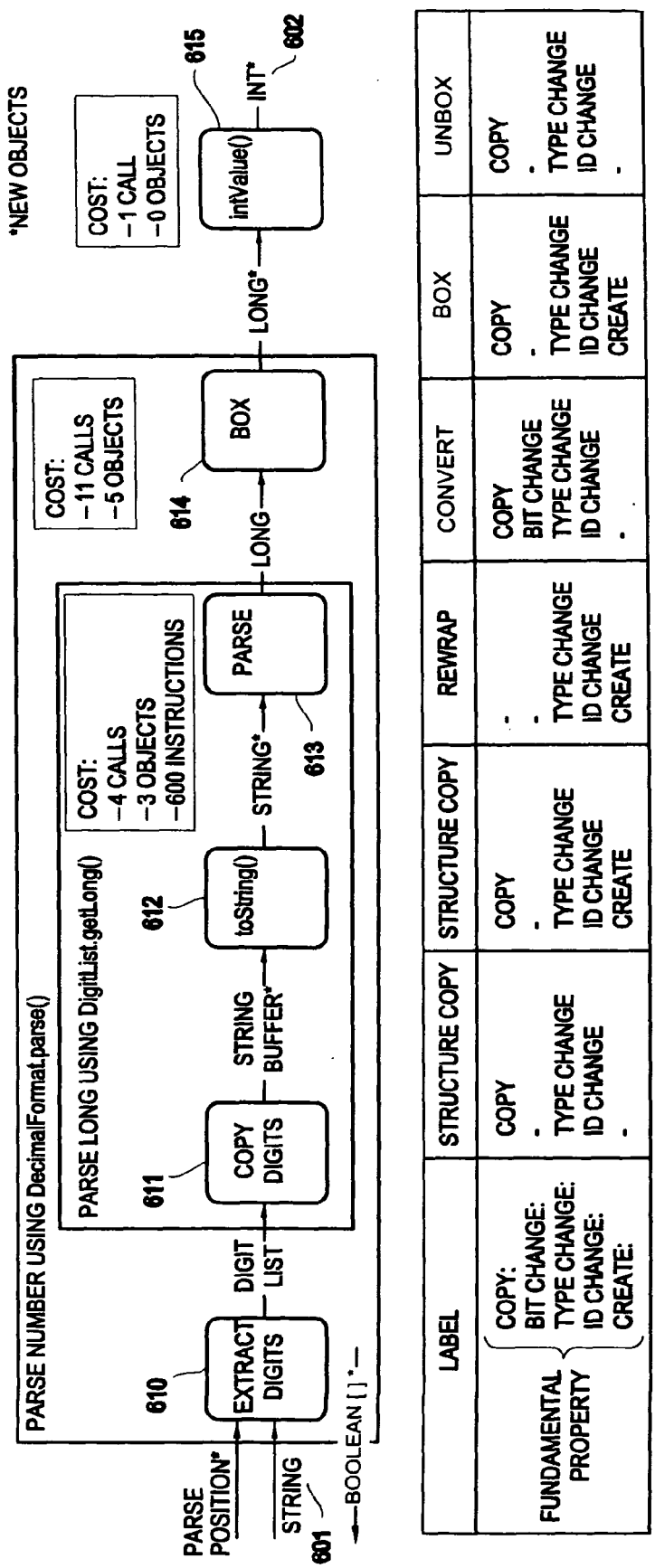
FIG. 6 further "zooms in" on node 510 (e.g., the first step of FIG. 5) to illustrate how the standard Java library's number-handling code may transform a subfield of a purchase date (such as a year, month, or day), according to an exemplary aspect of the present invention.

FIG. 6 further "zooms in" on node 510 (e.g., the first step of FIG. 5) to illustrate how the standard Java library's number-handling code may transform a subfield of a purchase date (such as a year, month, or day). That is, FIG. 6 illustrates the detail of extracting and parsing a single date subfield, in this case, a year. As illustrated in FIG. 6, even at this microscopic level, the standard Java library may require six transformations to convert a few characters in the String 601 (e.g., in "YYYY" representation) into the integer form 602 of the year.

The first five transformations (e.g., nodes 610-614) come from the general purpose DecimalFormat class which can parse or format any kind of decimal number. SimpleDateFormat, however, may use DecimalFormat for the special case of parsing integer months, days, and years. The first, fifth, and sixth transformations (nodes 610, 614, 615) may be necessary only because of this overgenerality. The first transformation (node 610) may look for a decimal point, an E for scientific notation, and rewrap the characters (e.g., node 610 may check fitsIntoLong( ) on a number representing a month).

Furthermore, since DecimalFormat.parse( ) may return either a double or long value, the fifth transformation may be needed to box the return value into an Object, and the sixth transformation may be necessary to unbox the return value.

Classifying Behavior

FIGS. 3-6 illustrate how the present invention may structure an analysis scenario in terms of transformations. To enable a deeper understanding, the inventors identified other ways (e.g., four other ways) of classifying transformations and data based on what the transformations and data accomplish.

These classifications revolve around the idea of recognizable phenomena drawn from the inventors' years of experience analyzing industrial applications. These same phenomena may occur over and over again, from one application or framework to the next. Classifying transformations and data in terms of these recognizable phenomena allows the present invention to compare what the transformations and data are accomplishing independent of the frameworks employed.

The present invention may first determine what the data accomplishes by looking at how transformations use that data. The present invention may provide a taxonomy for classifying the data at the edges (e.g., each edge) according to the purpose that the data serves in the transformation into which it flows. As described below, this can also be used to give insight into the purpose of the transformations that led to the production of that data.

The present invention may then determine what a transformation accomplishes by looking at how the transformation changes the data the transformation processes. It should be noted that there is an important distinction between the effect a transformation has on the physical representation of the data, and its effect on the logical content.

A Taxonomy of the Purpose of Data

The present invention introduces a taxonomy that may classify the input (e.g., each input) to a transformation according to the purpose that input data serves (It should be noted that the outputs of the top-level diagram are not necessarily classified because the outputs are the output of the analysis scenario and, therefore, their eventual use may not be known. Outputs of subdiagrams may be classified by the consuming transformation in the next higher diagram).

Some inputs provide the values that the transformation acts upon. These inputs may be classified as carriers. Other inputs provide ancillary data that facilitate the transformation. These inputs may be classified as facilitators.

Framework-based applications may expend a significant effort finding and creating facilitators, such as schemas, serializers, parsers, or connection handles.

FIG. 7 provides Table 1 which illustrates common phenomena that the inventors have identified, arranged as a taxonomy. Data may be classified flowing along an edge according to this taxonomy of how the subsequent transformation uses the data.

Figure 8:
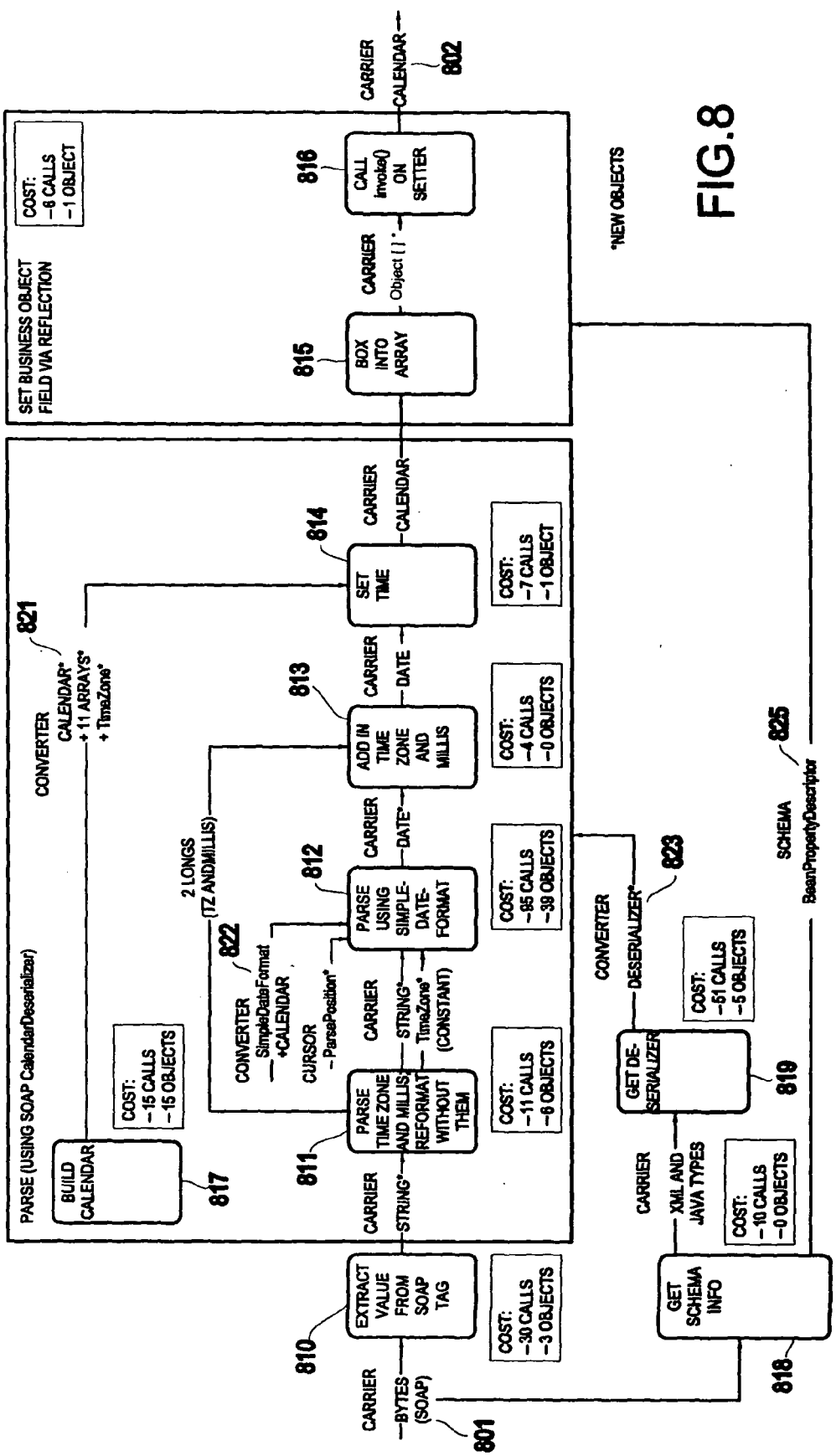
FIG. 8 illustrates the same dataflow diagram as FIG. 4, but with the edges classified by data purpose, according to an exemplary aspect of the present invention.

FIG. 8 illustrates the same dataflow diagram as FIG. 4, but with the edges classified by data purpose. As in FIG. 4, the input bytes 801 undergo seven transformations (e.g., in nodes 810-816) before exiting as a Calendar field 802 in the Java business object. However, in FIG. 8 the input of each transformation may be classified according to purpose.

Note the carriers along the edges of the middle row (e.g., the row including nodes 810-816). Also note facilitators such as converters: the Calendar 821 in the top row, the SimpleDateFormat 822 in the middle row, and the Deserializer 823 in the bottom row. These converters may serve the same broad purpose, though their implementations and the kinds of conversions they facilitate may be different. One input to the "parse using SimpleDateFormat" transformation is a ParsePosition, a Java library class that maintains a position in a String. This input may act as a cursor.

Note that the same data may be used as input to more than one transformation. In this case, the data may serve multiple purposes. The Calendar 821 in the top row of FIG. 8 may first serve as a converter when it facilitates the "set time" transformation, and then as a carrier of the purchase date into node 815 (e.g., the "box into array" transformation).

Classifying by purpose helps to assess the appropriateness of costs. For example, one would not expect the initialization of a converter to depend on the data being converted, but only on the type of data. It would seem strange, then, to see many converters for the parsing of fields. The scenario of FIG. 8 may require three converters to process a field.

A Flow-Induced Classification of the Purpose of a Transformation

The classification of input data according to the purpose served by that input data (as described above) may describe what input data are used for. However, finding or creating that input data itself often may require many transformations.

The following algorithm may take a classification of data purpose and induce a classification on the transformations that contributed to the production of that data:

1. Denote the entire dataflow diagram as D. The carrier subgraph is that set $C \subseteq D$ consisting of the nodes and edges encountered on traversals from initial inputs to final outputs that are entirely composed of edges classified as carrier. The facilitating subgraph is $F=D-C$; and
2. For each node $n \in D$, compute a set $L_n$ of induced labels as follows: If $n \in C$, then $L_n=\{carrier\}$. Otherwise, for each edge from F to C with label l, perform a backwards traversal within F and add l to $L_i$ for each node i encountered in the traversal.

For example, the Deserializer 823 in FIG. 8 has been classified as a converter; and the BeanPropertyDescriptor 825 has been classified as a schema.

Thus, the algorithm computes L for node 818 (e.g., the "get schema info" transformation) to be {converter,schema}, and for node 819 (e.g., the "get deserializer" transformation) to be {converter}. That is, the time spent getting schema information can be charged to a purpose.

How a Transformation Changes the Physical Representation of its Input Data

The present invention may also classify a transformation (e.g., each transformation) by how the transformation changes the physical representation of the data the transformation processes. There may be some common kinds of change to the physical form, despite the many implementations that accomplish that change. For example, the phenomena of converting data from one format to another may occur in many applications, implemented in a variety of ways. Note that this classification may be based only on how the transformation changes carrier inputs, not facilitator inputs.

FIG. 9 provides Table 2 which illustrates four phenomena (e.g., structure copy, rewrap, conversion, and box or unbox) that commonly occur in framework-based applications (it should be noted that there may be more phenomena not listed in Table 2). That is, Table 2 lists some common phenomena of change to physical representation. As illustrated in Table 2, a phenomenon may either always (indicated by a check mark in Table 2), never (indicated by an "x" in Table 2), or optionally (indicated by an * in Table 2) exhibit one of these five fundamental properties of change.

In the legend in FIG. 6, the first row of labels below the diagram shows how the present invention may classify a transformation according to these phenomena. Underlying these phenomena, the legend in FIG. 6 identifies five more fundamental properties of how a transformation may change the physical representation of its carrier inputs. The lower row of boxes in FIG. 6 shows this classification.

1) Copy: a transformation that copies the internal representation of the data to another location. Node 610 (e.g., the first transformation in FIG. 6) copies characters from a String to a DigitList, a Java library object that maintains its own character array;

2) Bit change: a transformation that modifies the internal representation of the data. Converting a number from characters to a binary form, for example, changes the bits. The node 613 (e.g., the "parse" step) in FIG. 6 is an example of this;

3) Type change: a transformation that changes the public interface to the data. Node 612 (e.g., the step labeled toString() in FIG. 6) takes a StringBuffer and produces a String containing the same characters. A type change reflects a change in the behavior available against is the data;

4) Identity change: a transformation that changes the owning reference to the data. Note that identity change does not imply a copy. Node 612 (e.g., the toString() transformation) is an example of this. The Java library may optimize StringBuffer.toString() so as to share the character array between the new String and the StringBuffer, until it is modified;

5) Create: a transformation that creates new storage for the output, rather than reusing existing storage. Node 610 (e.g., the first step, "extract digits"), is not marked as create since it copies its data into an existing DigitList that it reuses (It should be noted that a boolean classification may not always fine enough. For example, toString may be classified as a create, since it reuses part of its input. This may be sufficient, as long as there are some new objects).

The phenomena can now be expressed in terms of these fundamental properties. For example, as shown in Table 2 in FIG. 9, what makes a transformation a conversion is that the data is copied, and the resulting bits are different from the input form. This finer classification may allow a user to distinguish between the essential properties of a conversion and the variable ones (e.g. a conversion may or may not result in a new object).

Furthermore, this finer classification may expose commonalities among distinct phenomena. For example, a conversion and a boxing may both result in a change in type, even though they are accomplishing completely different ends.

How a Transformation Changes the Logical Content of its Input Data

A transformation may also be classified according to how the transformation changes the logical content of the data the transformation processes. This classification may be orthogonal to how physical representation changes. For example, a transformation that converts a stock holding from a database record into a Java object changes the physical form, but the output represents the same stock holding as the input. This transformation may be classified as information preserving, whereas the transformation may be classified as a conversion at the physical level.

Similar to the classification of change in physical representation, the present invention may identify commonly occurring phenomena of logical content change, and introduce a finer classification of fundamental properties. As noted above, the present invention may consider how the transformation changes its carrier inputs, but not facilitator inputs.

FIG. 10 provides Table 3 which lists common phenomena of change in logical content. Specifically, Table 3 lists common phenomena of changes to logical content expressed in terms of three fundamental properties (e.g., instance, value, granularity). Another fundamental property not included in Table 3 is "type".

For a given application, there may be consistent notions of instance, value, and granularity of information that are independent of any physical representation of that information. The present invention introduces a finer classification of logical content change based on change in these four fundamental properties (this list is not meant to be exclusive and should not be considered limiting).

1) Instance. Consider the process of making a Java object to represent the database record of a stock holding. This transformation does not change the instance represented at a logical level; it is still the same stock holding, only its physical representation has changed. In contrast, a transformation that finds the current quote for a stock holding is an exchange between two essentially different pieces of information.

2) Value. The stock holding transformation also results in no semantic change to the value of any of its constituents. It has the same stock name and a purchase date before and after, even if the two physical representations of the record are different. However, a transformation that adds shares would be a meaningful change in value.

3) Granularity. Converting a stock holding from a database record to a Java data structure preserves its granularity as a record. Extracting the purchase date field from that record results in a change in granularity, from record to field.

4) Type. This transformation may change data from one type (e.g., employee data) to another type (e.g., department data).

As shown in Table 3, common phenomena can be expressed in terms of fundamental properties. A transformation that preserves information content does not change the logical instance, value, or granularity. Other transformations may take one logical instance of information and return another (information exchange), or alter just the value represented (value add).

Note that a given transformation may map to more than one phenomenon. For example, a transformation that formats stock holdings and quotes into HTML is both a join of the two sets of records, and is adding value by formatting them.

FIG. 6 illustrates the six transformations to process a subfield of date in the Trade example. Node 610 (e.g., the first of the six transformations) extracts the digits of the subfield (e.g. year, month, day) from a String representing the entire date. Nodes 611-615 (e.g., the last five of the six transformations) preserve the information content. Looking at the analysis scenario in this way—as one extraction and five information preserving transformations—makes it clear what was (not) accomplished.

Quantifying Behavior

The present invention may utilize two classes of metrics for quantifying complexity and resource usage of framework-based applications. Both quantify behavior in terms independent of any one framework, enabling meaningful evaluation and comparison across applications.

Dataflow Topology-Based Metrics

The size and shape of the dataflow diagram for an analysis scenario are good indications of the complexity of an implementation. For example, as noted above, long sequences of transformations, spread across many layers of diagram, indicate over-general implementations, impedance mismatches between frameworks, or misused application programming interfaces (APIs). We may measure complexity by counting transformations, in three ways.

The base size metric may count transformations at a single level of diagram; cumulative size may measure the entire hierarchy of diagrams. For example, the first top-level step of converting a date to a business object field in FIG. 3 is implemented by a total of ten transformations at the next level down, and 58 transformations in total, which indicates that this is not a simple operation. Note that this assessment may require a normalization relating the measured complexity to what was accomplished, in this case processing one field. The granularity of the output produced may be a useful, framework-independent unit of normalization for all of the metrics used in the present invention.

A size histogram may break down cumulative size by level of diagram. In this example there are 8 transformations at the first level of depth, 14 at the second, and 36 at the third. This indicates that much of the activity is delegated to a distant layer.

The topology also lets us aggregate resource costs, such as number of calls or objects created, in ways that shed better light on framework-based applications than traditional ways of aggregating. A cumulative cost metric accumulates a resource cost for a transformation. For example, the transformation from FIG. 3 that has a cumulative size of 58 transformations cost 268 calls and 70 new objects.

A conventional profiling tool would aggregate costs by method, package, or path. However, for framework-based applications, showing costs by transformation or analysis scenario maps more closely to functions the programmers are interested in analyzing, and allows programmers to make comparisons across disparate implementations.

Behavior Signatures

Topological metrics may indicate how complex or costly an implementation is. To understand the nature of that complexity, the present invention introduces a class of metrics based on behavior classification. A behavior signature may be defined as a complexity or cost measure, broken down according to one of the classifications of the present invention. The behavior signature may capture how the complexity or costs of an implementation may be attributed to various categories of behavior.

FIG. 11 provides Table 4 which includes behavior signature of the analysis scenario of FIG. 6, with transformations broken down by change in physical content. That is, Table 4 summarizes the complexity of the analysis scenario of FIG. 6 with a behavior signature aggregated by change in physical representation.

Seeing so many type changes may lead the developer to ask whether she is using the wrong API calls, or calling a framework that was overly general for this task. Similarly, the existence of so many copies is a sign that either the developer or compiler is missing opportunities to optimize.

FIG. 12 provides Table 5 which includes two behavior signatures of FIG. 5, with transformations and object creations broken down by change in logical content. That is, Table 5 provides a breakdown in terms of change in logical content, for the analysis scenario of FIG. 5. The second column in Table 5 measures complexity by the number of transformations, and the third column measures cost by the cumulative number of objects created (note that FIG. 5 is not labeled by logical content change).

Note that for the latter behavior signature in Table 5, while objects created may be measured by all sub-transformations, in this case, the present invention assigns those costs based on the category label of just the top-level transformations. This allows the developer of the code at that level, who controls only how the top-level transformations affect logical content, to consider the cumulative costs incurred by his or her choices.

A flow-induced behavior signature may be defined as a behavior signature that aggregates according to the flow-induced transformation classification described above.

FIG. 13 provides Table 6 which illustrates two such signatures for FIG. 8. That is, Table 6 provides two flow-induced behavior signatures for FIG. 8 that break down cost by the purpose of data produced.

More specifically, Table 6 illustrates the costs incurred in the production of objects used for various purposes. Table 6 measures the number of calls and number temporary objects created aggregated by flow-induced label. The second row of the table pulls together all activity that leads to the production of converters. This includes the "build Calendar" and "get deserializer" transformations (nodes 817 and 819, respectively), which produced converters as their immediate output, as well as the "get schema info" transformation (node 818), which produced a carrier that was required for the production of the deserializer.

In addition to evaluating one implementation, behavior signatures can also be used to compare two or more applications, which may be useful for validating benchmarks as described above. Behavior signatures may also be used for identifying a baseline for evaluating a single application, and for characterizing classes of applications.

Further Examples

Below are two examples which demonstrate the power of the metrics described above.

First, the inventors analyzed the runtime complexity of the standard Java StringBuffer append methods. Over the years, the implementation has gone through three forms. It appears that appending a primitive value to a StringBuffer, a seemingly simple operation, is quite difficult to implement well. The inventors used behavior signatures to understand the mistakes made in the first two implementations, and to see whether the third needs further tuning.

FIG. 14 provides Table 7 which illustrates how behavior signatures may help to compare three implementations of the standard Java library method StringBuffer.append(int x). Even low-level operations such as this, which involve relatively few and insulated interactions, may be difficult to get right.

Specifically, Table 7 presents the three implementations, for the case of appending a primitive integer. The first implementation, used up until Java 1.4.2, delegates responsibility for turning the integer to characters to the String.valueOf(int) method. It copies and converts the integer, creating a new String carrier object. The StringBuffer then delegates to its own append(String) method the job of copying the String to its private character array. The second, Java 1.4.2, implementation uses a single character array per thread to carry the characters. This eliminates the construction of a new carrier object, but adds a lookup transformation instead (to fetch that array from thread-local storage). In the most recent, Java 1.5, implementation, StringBuffer simply asks Integer to fill in its own character array directly.

Each row of Table 7 is a behavior signature that captures the runtime complexity of an implementation. It is natural that appending should, at a minimum, require a copy. One would also expect, since integers and characters have different representations, to see one bit-changing transformation. The behavior signature of the third implementation shows these and nothing more.

Validating a Benchmark

A benchmark should exhibit the same kinds of runtime complexity as the applications that the benchmark is intended to represent. Behavior signatures can be used to validate benchmarks.

The inventors compared three web-based stock trading applications: a benchmark and two industrial applications deployed by large corporations. Their analysis scenario follows a field from an external data source into the Java object that will be used for producing the output. The scenario is restricted to transformations at the application level, which allowed the inventors to isolate the decisions that are under the control of the application developer from possibly inefficient implementations underneath.

FIG. 15 provides Table 8 which illustrates how behavior signatures may help to validate a benchmark against two applications of the kind it is intended to mimic. Each signature (e.g., a column in Table 8) may aggregate transformations by phenomena of physical change. That is, a column in Table 8 is a behavior signature that may measure complexity according to phenomena of physical change. The inventors studied two types of fields, Dates and BigDecimals. Since "app1" does not use BigDecimals that column was omitted from Table 8.

It is clear from Table 8 that the benchmark's complexity is strikingly different from that of the real applications. For example, the Date field in app2 goes through eight transformations at the application level: conversion from a legacy COBOL data source into a String; structure copy into a StringBuffer; rewrap back to a String; conversion to a primitive integer; conversion back to a String; structure copy to a StringBuffer; rewrap back to a String; finally, conversion to a Date. For the benchmark, the Date field starts out as bytes in a SOAP response, is converted to a field in a Java object representing the server's data model, and is rewrapped into a slightly different Java object, in the client's model.

Note that this analysis also highlights a difference between the two applications. Upon closer inspection, the inventors found that the two applications used very different physical models for their business objects. This points out one of the challenges in designing good benchmarks for framework-based applications: to capture the great variety of reasons things can go wrong.

Other Advantages

Conventional methods introduce classification in abstract terms for component interconnections and for characterizing configuration complexity. In particular, "design patterns" (e.g., a vocabulary of common architectural and implementation idioms) may allow developers to relate specific implementations to widely known patterns, and has been of immense value to how developers conceptualize, communicate, and evaluate designs. However, while conventional methods such as "design patterns" may abstract the structure of an implementation, the "phenomena" in the present invention may abstract what a run accomplishes in the transformation of data.

Further, a conventional method of "mining jungloids" may address a different problem in an application similar to the programs addressed by the present invention, but at development time, observing that, in framework-based applications, the coding process is difficult, due to the need to navigate long chains of framework calls.

Further, while there are many measures of code complexity and ways to normalize them, such as function points analysis, cyclomatic complexity and the maintainability index, in the present invention, the measures are geared toward evaluating runtime behavior, especially as it relates to surfacing obstacles to good performance.

Conventional performance understanding tools assign measurements to the artifacts of a specific application or framework. Characterization approaches on the other hand, allow comparisons across applications, but usually in terms of low-level, highly aggregated physical measures, leaving little room for understanding what is occurring and why. The present invention may combine measurement with a framework-independent vocabulary of phenomena, to be able to provide a descriptive characterization.

Further, some conventional methods may use data flow diagrams, at design time, to capture the flow of information through processes at a conceptual level. Compilers and some tools analyze the data flow of program variables in source code. The present invention, on the other hand, may use the data flow of logical content to structure runtime artifacts. This may also set the present invention apart from existing performance tools, which typically organize activity based on control flow.

Other Applications

In the present invention, both the formation and classification of diagrams may be automated. Escape analysis and other analyses that combine static and dynamic information can aid in constructing the hierarchy of diagrams. The discovery of certain of the fundamental properties (e.g., see FIGS. 6 and 10) can be automated. Other classifications may require annotation of frameworks by developers. Automation would enable further validation of the approach of the present invention on more applications.

Further, in addition to the classifications described above, there may be additional classifications that relate runtime complexity more closely to design-time issues. One is in terms of design causes, such as late binding, eager evaluation, and generality of implementation. Another captures the complex issues of physical data modeling. The inventors have found that some designs use the Java type system directly. Others implement entire type systems on top of Java. Thus, there may be a classification that explains these varieties in more fundamental terms.

Second, in addition to evaluation and comparison of implementations, the approach of the present invention is useful for characterizing whole classes of applications. For example, server and client applications both make heavy use of frameworks, but may be complex for different reasons. The former's excesses may lie largely in information-preserving transformations; the latter may spend more time on lookups and other information exchanges.

Behavior signatures could capture this distinction, and could also capture the essential complexities in real applications, for use in designing good benchmarks, in establishing a baseline for evaluating a single implementation, or in establishing best practices. For example, the prevalence of certain phenomena indicate a need for better compiler design; others are a sign of poor API design; copying and boxing are in the realm of compilers, whereas information exchanges point to design issues, such as over-general implementations.

Third, additional framework-independent metrics may be derived from the present invention. Having a number of orthogonal classifications enables multidimensional analysis of complexity and costs. There may be metrics that take into account additional context from the dataflow topology. For example, the time spent facilitating the creation of facilitators (not an uncommon occurrence) may be measured.

In summary, the advent of reusable frameworks has been a boon for the development of large-scale applications. The flip side seems to be complex and poorly-performing programs. Developers can not make informed design decisions because costs are hidden from them. Moreover, framework designers can not predict the usage of their components. They must either design overly general frameworks, or ones specialized for use cases about which they can only guess. The present invention introduces a way to frame discussions and analysis of this kind of complexity.

Referring again to the drawings, FIG. 16 illustrates a typical hardware configuration which may be used for implementing the computer system and method according to the exemplary aspects of the present invention. The configuration has preferably at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting an information handling system to a data processing network, the Internet, and Intranet, a personal area network (PAN), etc., and a display adapter 1636 for connecting the bus 1612 to a display device 1638 and/or printer 1639. Further, an automated reader/scanner 1641 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 1611 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 1611 and hardware above, to perform the method of the invention.

This signal-bearing media may include, for example, a RAM contained within the CPU 1611, as represented by the fast-access storage for example. Alternatively, the instructions may be contained in another signal-bearing media, such as a magnetic data storage diskette 1700 (FIG. 17), directly or indirectly accessible by the CPU 1611.

Whether contained in the computer server/CPU 1611, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media. In an illustrative embodiment of the invention, the machine-readable instructions may comprise software object code, complied from a language such as "C" etc.

In summary, the inventors analyzed many applications (e.g., industrial, framework-based applications) in which simple functionality often required excessive runtime activity. It is increasingly difficult to assess if and how inefficiencies can be fixed. Much of the application's activity involves the transformation of information, due to framework couplings. The present invention provides a method and system for modeling and quantifying behavior in terms of what transformations accomplish.

The present invention may structure activity into dataflow diagrams that capture the flow between transformations. Across disparate implementations, commonalities in how transformations use and change their inputs may be observed. The present invention may introduce vocabulary of common phenomena of use and change, and four ways to classify data and transformations using this vocabulary. The structuring and classification may enable evaluation and comparison in terms abstracted from implementation specifics.

The present invention may also introduce metrics of complexity and cost, including behavior signatures that attribute measures to phenomena. The present invention may also demonstrate the approach on a benchmark, a library, and two industrial applications.

With its unique and novel features, the present invention provides a method and system for modeling runtime behavior, and more particularly, a method and system which provides an approach to understanding the general causes of runtime complexity and inefficiency in large-scale applications.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive system is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A method of modeling runtime behavior for a software application, comprising:
  limiting a portion of a run to be analyzed using criteria that define an analysis scenario;
  structuring events of said analysis scenario as a flow of logical content through a plurality of transformations of the logical content, independent of a physical structure of source code that is executing;
  applying labels to elements of said flow; and
  generating a behavior signature for said analysis scenario using a processor, the generating of the behavior signature being based on said labels and comprising aggregating execution flow information according to the plurality of transformations of the logical content,
  wherein the structuring of the events of the analysis scenario includes structuring the events into a hierarchy of data flow diagrams depicting a node representing a transformation of the plurality of transformations, the logical content which is an input to the node, and the logical content which is output from the node and has been transformed in the transformation,
  wherein said generating said behavior signature comprises aggregating metrics according to said labels, and
  wherein said aggregating metrics comprises using one of a physical resource cost as a metric, a number of transformations in said plurality of transformations as a metric of runtime complexity, and metrics drawn from properties of one of source code and system architecture.

2. The method of claim 1, wherein the plurality of transformations of the logical content comprises a plurality of physical transformations of the logical content, and said structuring said events of said analysis scenario comprises structuring said events into a hierarchy of data flow diagrams depicting the plurality of physical transformations of the logical content.

3. The method of claim 1, wherein said applying said labels comprises applying a label which describes general phenomena, independent of datatype, algorithm, module structure, or other artifact of a specific implementation.

4. The method of claim 3, wherein said applying said labels comprises at least one of: applying a label to a transformation of said plurality of transformations; applying a label to an input which depicts a flow of input data to said transformation; and applying a label to an output which depicts output data from said transformation.

5. The method of claim 4, wherein said applying said labels comprises labeling said input according to a purpose that said input data serves in said transformation.

6. The method of claim 5, wherein said applying said labels comprises labeling said input by classifying said input as one of a carrier of data to be transformed in said transformation, and a facilitator of said transformation.

7. The method of claim 5, wherein said applying said labels comprises labeling said input according to a taxonomy of facilitators.

8. The method of claim 4, wherein said applying said labels comprises labeling said transformation by classifying said transformation based on a manner in which said transformation transforms a logical content of said input.

9. The method of claim 4, wherein said input data comprises carrier input data, and said applying said labels comprises labeling said transformation based on a manner in which said transformation transforms one of:
   a logical value of said carrier input data for said transformation;
   a logical instance identity of said carrier input data for said transformation;
   a logical granularity of said carrier input data for said transformation; and
   a logical data type of said carrier input data for said transformation.

10. The method of claim 4, wherein said applying said labels comprises labeling said transformation based on a classification of how said transformation transforms a physical form of said input data.

11. The method of claim 10, wherein said input data comprises carrier input data, and said applying said labels comprises labeling said transformation based on one of:
   a manner in which said transformation affects a copy of said carrier input data for said transformation;
   a manner in which said output of said transformation includes newly created objects;
   a manner in which said transformation transforms an internal representation of said carrier input data for said transformation;
   a manner in which said transformation transforms a data type of said carrier input data for said transformation; and
   a manner in which said transformation transforms an instance identity of said carrier input data for said transformation.

12. The method of claim 4, wherein said applying said labels comprises:
   identifying another transformation in said plurality of transformations, said transformation contributing to at least one of said another transformation, an input depicting a flow of input data to said another transformation, and an output depicting a flow of output data from said another transformation; and
   applying another label to said at least one of said another transformation, said input for said another transformation, and said output from said another transformation, wherein said applying said label comprises applying said label to at least one of said transformation, input for said transformation, and
   output from said transformation, based on said another label.

13. The method of claim 12, wherein said applying said labels comprises labeling said transformation according to a purpose of said input data for said another transformation.

14. The method of claim 1, further comprising:
   deploying computing infrastructure in which computer-readable code is integrated into a computing system, such that said code and said computing system combine to perform said limiting said portion of said run, said structuring said events, said applying said labels, and said generating said behavior signature.

15. A system for modeling runtime behavior for a software application, comprising:
   a processor which executes instructions to perform a function of:
      a limiter which limits a portion of a run to be analyzed using criteria that define an analysis scenario;
      an event structurer which structures events of said analysis scenario as a flow of logical content through a plurality of transformations of the logical content, independent of a physical structure of source code that is executing;
      a label applicator which applies labels to elements of said flow; and
      a behavior signature generator which generates a behavior signature for said analysis scenario based on said labels, the behavior signature comprising aggregated execution flow information according to the plurality of transformations of the logical content,
   wherein the structuring of the events of the analysis scenario includes structuring the events into a hierarchy of data flow diagrams depicting a node representing a transformation of the plurality of transformations, the logical content which is an input to the node, and the logical content which is output from the node and has been transformed in the transformation,
   wherein said generating said behavior signature comprises aggregating metrics according to said labels, and
   wherein said aggregating metrics comprises using one of a physical resource cost as a metric, a number of transformations in said plurality of transformations as a metric of runtime complexity, and metrics drawn from properties of one of source code and system architecture.

16. The system of claim 15, wherein said event structurer structures said events of said analysis scenario as a hierarchy of data flow diagrams.

17. The system of claim 16, wherein said event structurer comprises a data flow diagram generator which structures an event of said portion of said run into said hierarchy of said data flow diagrams.

18. A non-transitory programmable storage medium tangibly embodying a program of machine-readable instructions executable by a digital processing apparatus to perform a method of modeling runtime behavior for a software application, said method comprising:
   limiting a portion of a run to be analyzed using criteria that define an analysis scenario;
   structuring events of said analysis scenario as a flow of logical content through a plurality of transformations of the logical content, independent of a physical structure of source code that is executing;
   applying labels to elements of said flow; and
   generating a behavior signature for said analysis scenario based on said labels, the generating of the behavior signature comprising aggregating execution flow information according to the plurality of transformations of the logical content,
   wherein the structuring of the events of the analysis scenario includes structuring the events into a hierarchy of data flow diagrams depicting a node representing a transformation of the plurality of transformations, the logical content which is an input to the node, and the logical content which is output from the node and has been transformed in the transformation,
   wherein said generating said behavior signature comprises aggregating metrics according to said labels, and
   wherein said aggregating metrics comprises using one of a physical resource cost as a metric, a number of transformations in said plurality of transformations as a metric of runtime complexity, and metrics drawn from properties of one of source code and system architecture.

* * * * *